United States Patent [19]

White et al.

[11] Patent Number: 5,398,889

[45] Date of Patent: Mar. 21, 1995

[54] AIRCRAFT FUSELAGE LINING SYSTEM

[75] Inventors: Roland J. White, Kirkland; Douglas H. Quimby; Brian M. Clark, both of Seattle; James W. Clyne, Jr., Bellevue, all of Wash.

[73] Assignee: Furon Company, Laguna Niguel, Calif.

[21] Appl. No.: 199,602

[22] Filed: Feb. 22, 1994

[51] Int. Cl.⁶ .............................................. B64C 1/40
[52] U.S. Cl. ........................... 244/119; 244/121; 244/129.1; 52/407.1; 52/407.5
[58] Field of Search .............. 244/129.1, 117 R, 119, 244/121, 133, 158 A; 52/407.1, 407.5, 404.3, 404.1

[56] References Cited

U.S. PATENT DOCUMENTS

| | | | |
|---|---|---|---|
| 2,326,717 | 8/1943 | Zeidler | 52/407.1 |
| 2,856,039 | 10/1958 | Hawkinson | 52/407.1 |
| 3,108,924 | 10/1963 | Adie | 244/133 |
| 3,740,905 | 6/1973 | Adams | 52/173 |
| 3,846,949 | 11/1974 | Okawa | 52/407.1 |
| 3,867,244 | 2/1975 | Adams | 161/133 |
| 3,876,492 | 4/1975 | Schoff | 244/133 |
| 4,235,398 | 11/1980 | Johnson | 244/119 |
| 4,291,851 | 9/1981 | Johnson | 244/119 |
| 4,344,591 | 8/1982 | Jackson | 244/158 A |
| 4,446,661 | 5/1984 | Jonsson et al. | 52/407.5 |

FOREIGN PATENT DOCUMENTS 401598 11/1933 United Kingdom .............. 244/133

OTHER PUBLICATIONS

Product Data Sheet, published by Ciba Composites, U.S.A. of Anaheim, Calif., includes seven photographs of liners.

Primary Examiner—Galen L. Barefoot
Attorney, Agent, or Firm—Christie, Parker & Hale

[57] ABSTRACT

A liner for an aircraft comprises a sheet of material having a plurality of standoffs integral with the liner sheet that extend in opposite directions from the plane defined by the liner sheet. Standoffs extending in one direction comprise an end portion for accommodating placement against the inside surface of the fuselage skin. Standoffs extending in an opposite direction have a generally planer end portion to accommodate the placement of an insulation blanket thereon. The liner comprises a matrix of both types of standoffs uniformly distributed throughout the liner sheet. A plurality of openings are through the sheet between the standoffs. The standoffs extend a predetermined distance from the plane of the liner sheet to provide a predetermined amount of separation between the inside surface of the skin and insulation blanket. The openings provide a fluid flow path for condensate formed at the blanket side of the liner to flow downwardly from the blankets along the inside surface of the skin down to the bilge of the aircraft where it is removed.

27 Claims, 8 Drawing Sheets

AIRCRAFT FUSELAGE LINING SYSTEM

FIELD OF THE INVENTION

This invention relates generally to a lining system used in a fuselage compartment of an aircraft and, more particularly, to a liner used to separate an inside surface of the fuselage skin from a layer of thermal insulation for purposes of enhancing condensate management.

BACKGROUND OF THE INVENTION

The fuselage compartment of an aircraft is enclosed by an outer shell, which generally includes a metal skin attached to a metal structure comprising a number of axially spaced apart curved frame members that are rib like and a number of circumferentially spaced apart axially extending straight stiffener members. The curved frame members are normally called "frames" and the straight stiffener members are normally called "stringers". Since temperatures within the fuselage compartment must usually be controlled in order to ensure a proper environment for occupants and cargo, most fuselage shells also include some form of thermal insulation that is placed adjacent the inside surface of the fuselage shell between the frames. Insulation typically used to insulate an aircraft comprises layers of fiberglass placed between two layers of water-resistant film made of materials such as polyvinyl fluoride, polyester and the like to form what is called an "insulation blanket." Such insulation blankets are usually about one inch thick and may be formed by sewing, taping, or heat sealing the two film layers together at the edges of the insulating material to encapsulate the insulating material between the film layers. While the use of water-resistant materials as the blanket cover retards moisture ingress into the insulation, the film layers typically comprise a plurality of perforations for accommodating contraction and expansion of the air trapped within the insulation blanket during the operation of the aircraft, e.g., during its ascent and descent. Therefore, the insulation blankets are not air tight or water proof.

Condensate is formed within an aircraft when the air within the fuselage compartment is cooled to a temperature below its dew point, causing the water constituent of the air to condense. This is known to occur within the fuselage compartment of the aircraft at a location at or near the inside surface of the fuselage skin. The location where such condensation takes place depends on the temperature profile of the air as you move away from the inside surface of the skin toward the center of the aircraft. The amount of condensate formed within the aircraft depends on several variables such as the relative humidity of the air within the aircraft and the temperature outside the aircraft which determines the temperature of the aircraft skin.

Accordingly, depending on the temperature profile and the particular conditions, condensate may be formed at the inside surface of the fuselage skin or within a short distance away, including within the insulation blanket. Condensate that is formed at the inside surface of the skin of the aircraft can be absorbed by the adjacent insulation by means of the condensate passing through the perforations in the insulation blankets' film surface. Both the condensate which enters the insulation blanket and that which forms within does not freely flow from the blanket due to the small size of the perforations and the related tendency for the perforations to plug up. Thus, instead of minimizing condensate absorption by the insulation and enhancing condensate management within an aircraft, the use of water-resistant films to encapsulate the fuselage insulation has aggravated the problem, resulting in the aircraft carrying a number of bulging, water-filled insulation blankets.

Ideally, the condensate formed within the aircraft should be allowed to flow along the inside surface of the fuselage free of the insulation blanket to a common collection point within the plane, e.g., to the bilge, where it can be collected and then removed. The absorption of condensate by the insulation within the insulation blankets prevents the effective elimination of condensate from the aircraft. Condensate absorption by the insulation is undesirable because it reduces the effectiveness of the insulation to insulate the passenger compartment of the aircraft from heat loss through the cold fuselage skin. Condensate absorption by the insulation also adds unnecessary weight to the aircraft, since it remains on the aircraft instead of being removed therefrom. In a Boeing 747 aircraft, for example, the added weight due to absorbed condensate can be as much as 600 pounds, which can increase the operating cost of the aircraft by about $80,000 per year.

Ideally, air and water vapor should be allowed to circulate between the skin of the aircraft and the insulation blanket. This circulation promotes the removal of small droplets of condensation that are not large enough to drip and flow on their own, by allowing vapor drying to occur. To provide for this drying, a space must be provided between the skin of the aircraft and the insulation blanket, and air must be allowed to flow freely within this space.

In addition to the above-described problems associated with condensate (water) absorption by the insulation blankets because the blankets rest against the inside surface of the fuselage skin, the insulating materials also absorb other types of liquids that may have been spilled into the cargo compartment. Such spillage is common and again results in decreased insulating effectiveness, increased weight, and the possible formation of biological growth and the resulting release of unpleasant odors into the aircraft.

Ultimately, the absorption of condensate and other liquids by the insulation requires the frequent replacement of the insulation blankets, which increases downtime, thereby adding to the costs of operating the aircraft in addition to costs which are added as a result of carrying extra weight.

Accordingly, the need exists for a device which is capable of reducing the amount of condensate and other liquids that are absorbed into and/or retained by the insulation blankets installed in the aircraft fuselage. The device should also permit any condensate formed at or within the insulation blanket to flow freely away from the blanket to the inside surface of the fuselage skin to where it can be routed downwardly to the bilge where it can be removed from the aircraft. The device should be constructed in such a manner to accommodate its convenient use and application during the assembly of a new aircraft as well as during repairs or retrofits of old aircraft.

SUMMARY OF THE INVENTION

Liners are provided for use in aircraft to provide a predetermined amount of separation between the aircraft fuselage skin and the insulation blankets which are installed in the aircraft to reduce heat loss. The liners are effective for minimizing the absorption of condensate by the insulation blankets and for facilitating the management of the flow of condensate along the skin of the aircraft to the bilge for subsequent removal.

In one embodiment, the liners of the present invention are formed into a resilient configuration from sheets of thermoplastic material. Each such liner incorporates a plurality of first standoffs that are integral with the sheet of material and which extend a predetermined distance from the plane defined by the sheet. A plurality of second standoffs, which are integral with the sheet, extend a predetermined distance from the plane of the sheet in a direction opposite to the first standoffs. A plurality of openings are within the sheet, with each such opening being positioned between adjacent first and second standoffs.

The liners are installed within the aircraft fuselage compartment between the inside surface of the fuselage skin and the insulation blanket. The first standoffs are positioned against the inside surface of the skin and the insulation blanket is positioned against the second standoffs. Condensate formed on the blanket side of the liner can flow through the liner openings and is directed downwardly to the fuselage side of the liner and thence along the fuselage surface to the aircraft bilge, where it is pumped overboard. Condensate formed on the inside surface of the fuselage skin can flow along the skin and around the skin standoffs, eventually flowing to the bilge for removal. Additionally, air circulated through the liners and through the openings effects condensate removal by vapor drying.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

Figure 1:
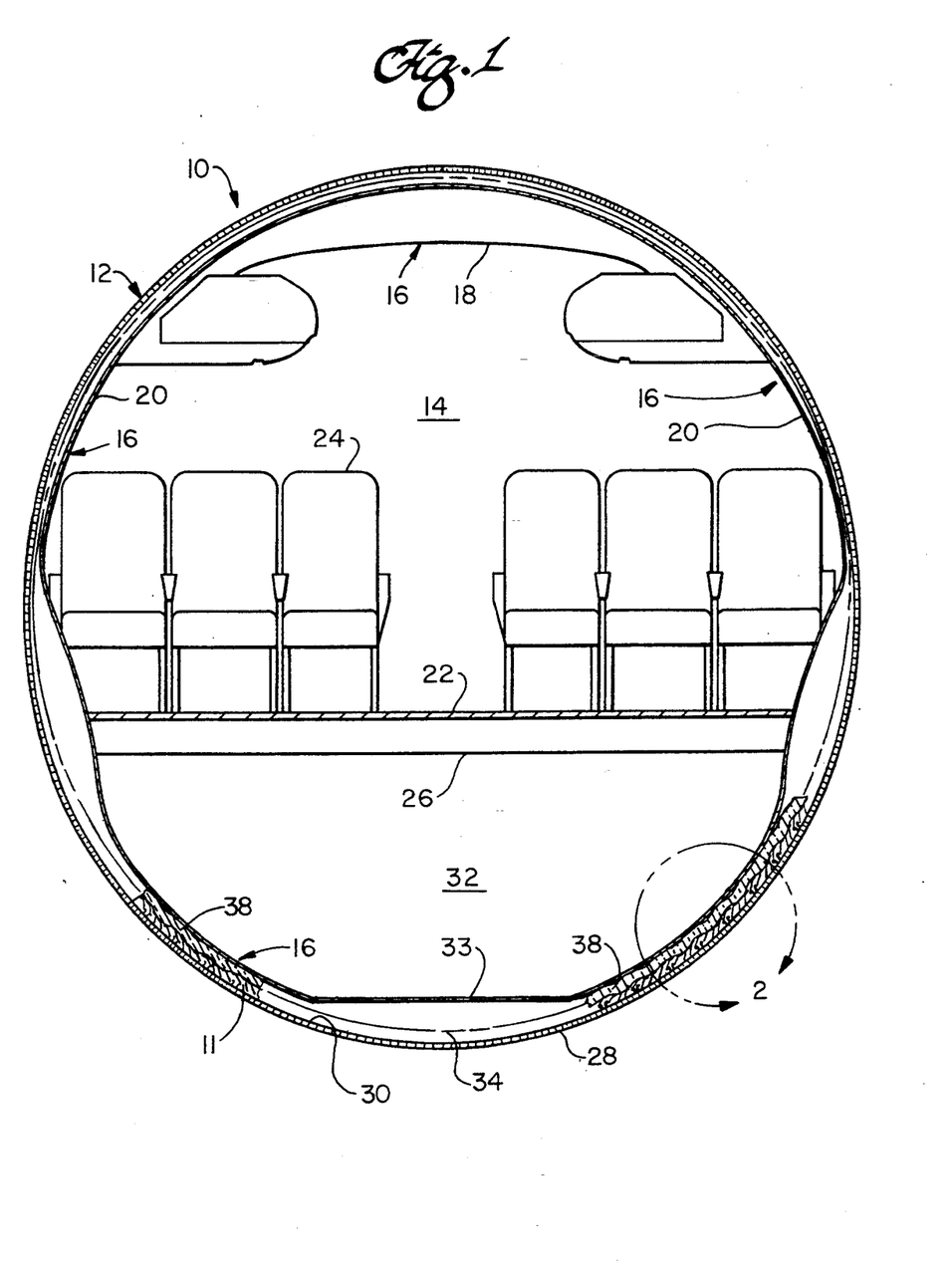
FIG. 1 is a semi-schematic, cross-sectional view of an aircraft fuselage showing a preferred embodiment of a liner constructed according to principles of this invention mounted within the fuselage for facilitating condensate management.
Figure 2:
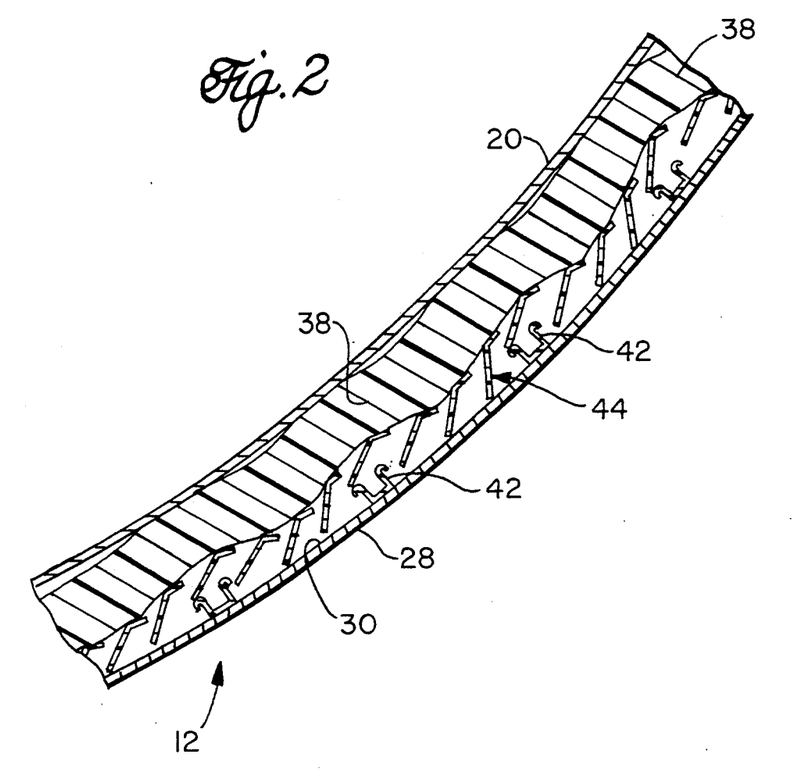
FIG. 2 is a semi-schematic, exploded view of the circled section 2 of the fuselage of FIG. 1.

Referring to FIG. 1 and to FIG. 2, which is an exploded view of one portion of FIG. 1, there are shown semi-schematic cross-sectional views of an aircraft fuselage 10 into which a plurality of liners 11 provided in accordance with the practice of the present invention are mounted. While the liners 11 of the present invention are described as being installed in the illustrated aircraft, it should be understood that such liners can be effectively used with essentially any type or model of aircraft.

The illustrated aircraft fuselage 10 comprises a fuselage shell 12 and a fuselage compartment 14 defined by the shell. The fuselage compartment 14 is shown in the form of a passenger compartment defined by trim panels 16 including an overhead or ceiling panel 18, a pair of side panels 20, and a floor panel 22. The floor panel, together with a plurality of passenger seats 24, are supported within the fuselage compartment by floor beams 26. The fuselage shell 12 comprises a surface 28 that defines the outside surface or skin of the aircraft and a surface 30 opposite the outer surface that forms the inside surface of the skin of the aircraft. The fuselage compartment also comprises a cargo compartment 32 that resides below and is separated from the passenger compartment by the floor panel 22. A bilge 34 is defined at the lowermost portion of the fuselage compartment between a floor 33 of the cargo compartment and the inside surface of the skin 30 of the fuselage.

In an exemplary embodiment, each liner 11 is placed between the inside surface of the skin 30 of the aircraft and an aircraft insulation blanket 38 in the aircraft's cargo compartment 32. It should be understood that, while the liners of the present invention are described and shown as being installed in the cargo compartment, such liners may be installed around the entire fuselage of the aircraft, if desired. The liner is provided to minimize absorption by the insulation blanket of condensate that is formed at the inside surface of the skin of the aircraft, to facilitate the drainage of any condensate formed in the blanket away from the blanket, to provide air flow passages between the inside surface of the skin and the blanket to effect vapor drying, and to enhance condensate management within the aircraft. The liners of the present invention may be placed into position during the original construction of the aircraft or during its maintenance or repair.

Figure 3:
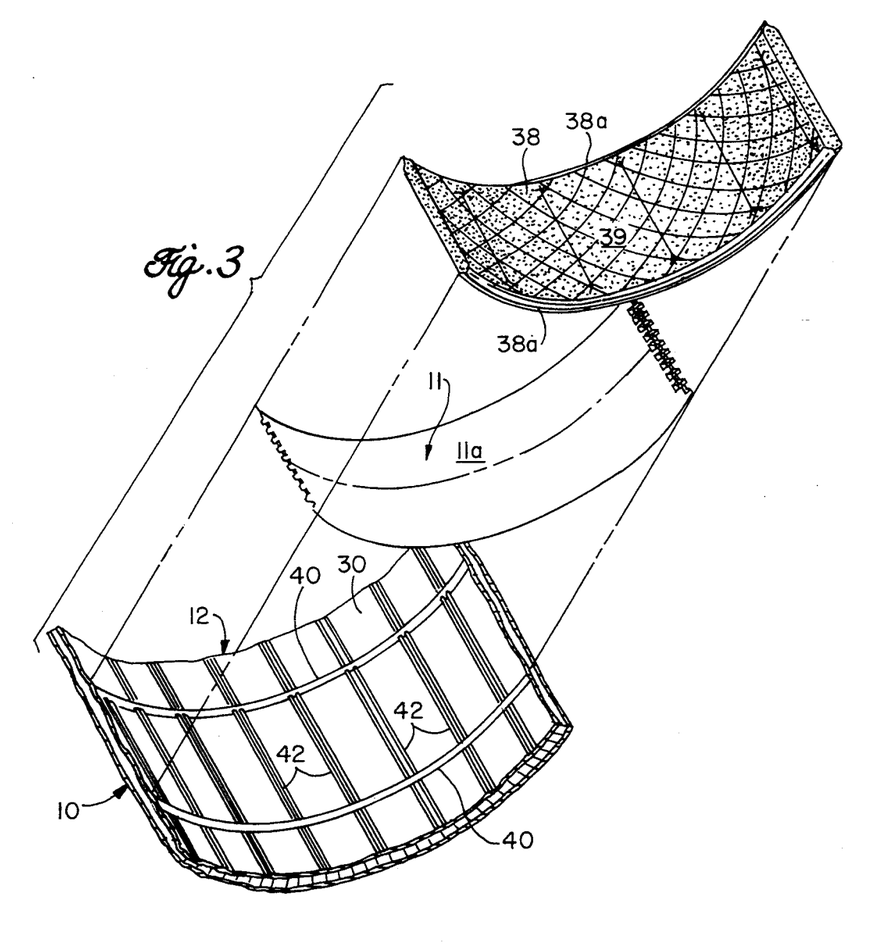
FIG. 3 is a semi-schematic, exploded, fragmentary view of an aircraft fuselage compartment comprising a section of the fuselage showing frames, stringers, an inside surface of the skin, the liner of the present invention, and an insulation blanket.

The positioning and function of the liners 11 can be more readily understood by referring to FIG. 3, in addition to FIGS. 1 and 2, where FIG. 3 shows a fragmentary exploded view of the aircraft fuselage 10, a liner 11 of the present invention, and an insulation blanket 38. The fuselage construction includes a plurality of axially spaced apart curved frame members or frames 40 that are rib like and which extend circumferentially around the inside surface of the skin 30 of the fuselage shell 12, spaced apart along the length of the aircraft, to provide radial strength, and a plurality of circumferentially spaced apart axially extending straight stiffener members or stringers 42. This combined structure provides strength for many forms of loading. The stringers provide bending and buckling stiffness for the skin, along with axial strength. Each stringer has a number of holes (not shown) therethrough spaced along its length to allow flow of condensate downwardly along the inside surface of the skin 30 of the fuselage to the bilge.

Each of the liners 11 of the present invention is installed between a pair of adjacent frames over the stringers and against the aircraft's skin. The liners are installed so that the liner surfaces adjacent the inside surface of the skin and blankets are oriented in a particular manner to direct condensate drainage away from the blankets and downwardly along the inside surface of the skin of the fuselage. As best shown in FIG. 2, each liner comprises a plurality of integral separating members 44 that physically separate the blanket from the inside surface of the skin. As described in greater detail below, the separating members are oriented within the liner to extend away from the liner sheet in a uniform direction, i.e., at a preferred angle from a plane defined by the liner sheet. This construction provides for maximum condensate drainage from the blankets by directing the condensate from the blankets away from the blanket in a downwardly direction to the inside surface of the skin. To achieve such condensate drainage the liners are installed within an aircraft with the separating members 44 oriented in a downwardly facing direction, moving from the end of the separating member contacting the blanket to the end of the separating member contacting the inside surface of the skin.

In one embodiment, the liner extends only around that portion of the fuselage that defines the cargo compartment. The insulation blanket 38 is placed between adjacent frames 40 and onto the facing surface 11a of the liner. The blanket can then be attached to the fuselage by using conventional fastening means (not shown), such as nylon fasteners or the like, to attach edge portions 38a of the blanket to each adjoining frame 40. A trim panel (not shown in FIG. 3) is then placed over the facing surface 39 of the insulation blanket 38 to form the cargo compartment wall and floor 33.

The liners of the present invention are formed from sheets of materials and incorporate a plurality of integral portions that extend from the plane of the sheet to provide a predetermined setoff distance between the insulation blankets and the inside surface of the fuselage skin. These integral portions of the liner are referred to herein as "standoffs" and can be formed by deforming a portion of the liner sheet so that the standoffs extend away from the plane of the sheet. Such standoffs may extend from the plane of the sheet in a single direction from one surface of the sheet or may extend from the plane of the sheet in opposite directions from opposing liner sheet surfaces. The standoffs serve to provide a suitable surface for accommodating placement of the blanket thereon, which results in a predetermined amount of separation between the inside surface of the skin and the insulation blanket to thereby prevent the condensate formed on the skin surface from contacting the blanket and being absorbed thereby.

The liners are constructed having a configuration of standoffs that result in its being resilient, i.e., having the ability to spring back after subjected to a compressive force. The liner's resilience permits its installation and use between the inside surface of the skin and the insulation blankets without being crushed or permanently deformed so that the predetermined setoff distance between the skin and blankets is maintained at all times.

The liners are constructed having a plurality of openings formed therethrough. The openings provide a path for condensate formed on the insulation blanket side of the liner or within the insulation blanket itself to flow to the fuselage side of the liner where it flows downwardly along the fuselage skin for collection in the bilge for subsequent removal from the aircraft. A liner that does not have such openings is undesirable because the condensate formed at or within the insulation blankets is not allowed to drain from the blankets to the bilge but, rather, remains stored within the blankets trapped between the blanket and liner. The water adds weight to the aircraft which results in increased operating costs and additionally causes the blankets to deteriorate so that they must be replaced more frequently than desired.

A key feature of the liners of the present invention is that the standoffs and openings are arranged and configured to enhance condensate management by maximizing condensate drainage away from the blankets and downwardly to the inside surface of the skin, and to enhance condensate removal by providing air passages between the blankets and skin to effect vapor drying. The standoffs and openings are arranged and configured having no pockets or cavities formed between the liner and the blankets to trap or collect pools of condensate.

Figure 4:
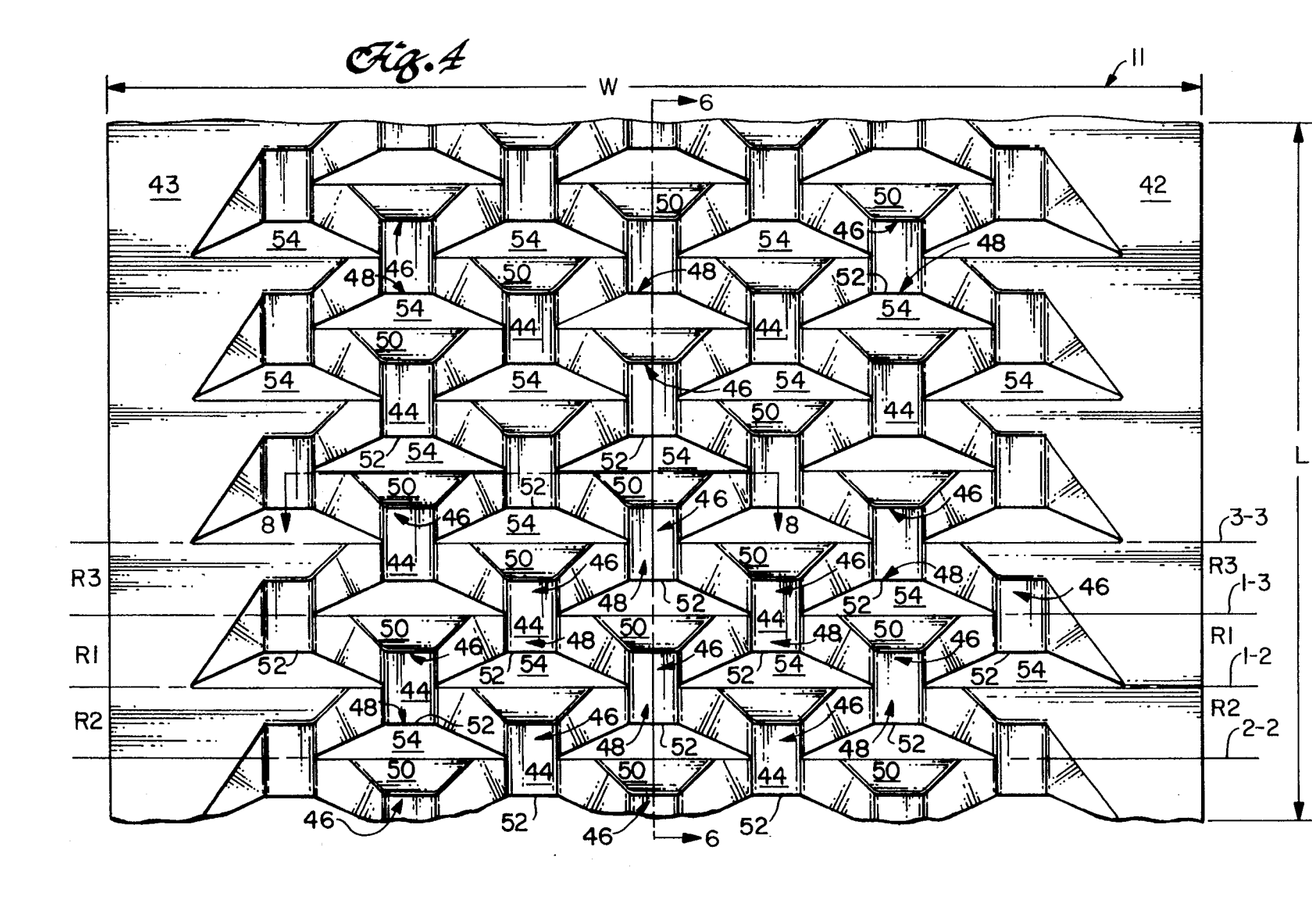
FIG. 4 is a semi-schematic plan view of a preferred embodiment of the liner of the present invention as viewed from within an aircraft fuselage compartment, illustrating the surface of the liner onto which the insulation blanket is to be placed.
Figure 5:
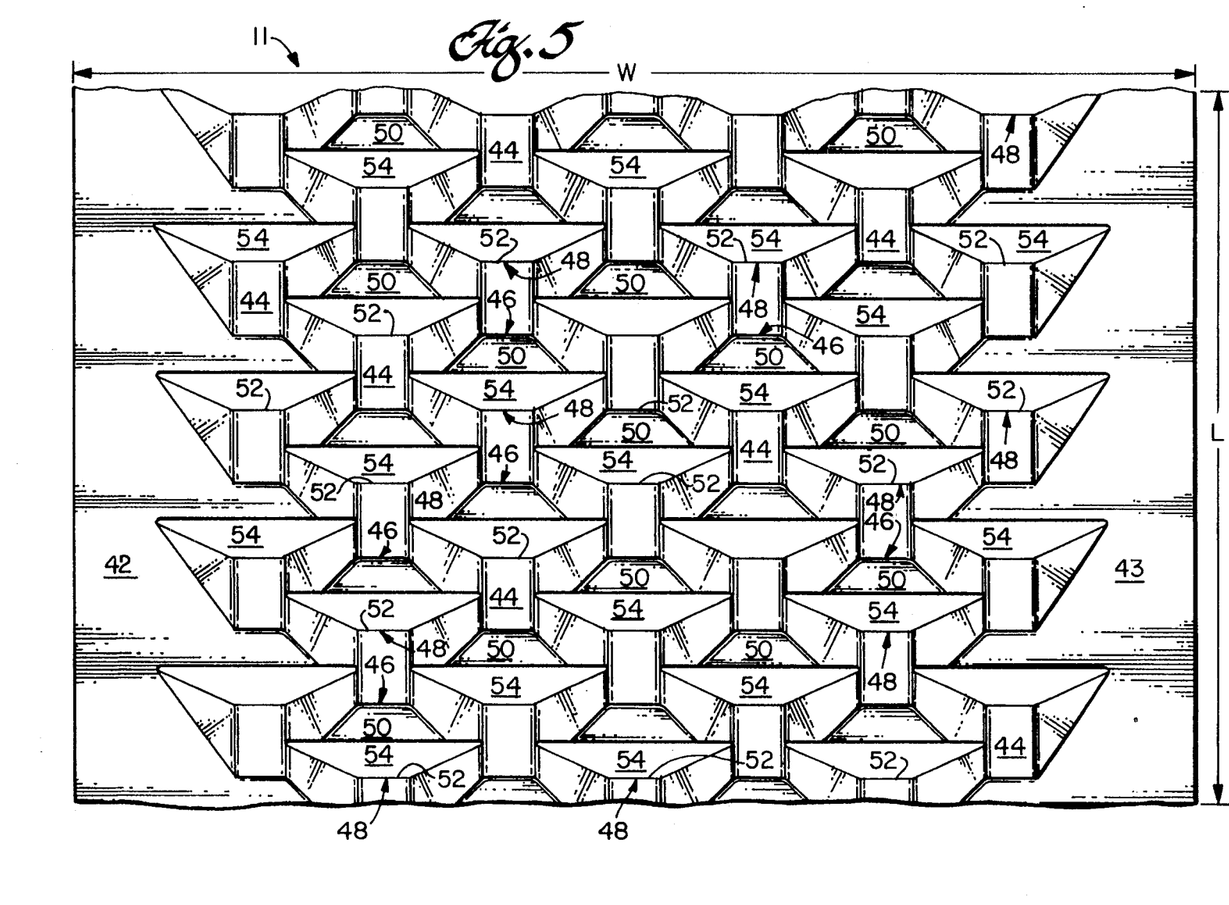
FIG. 5 is a semi-schematic plan view of the liner shown in FIG. 4 as it would appear if looking through the fuselage of the aircraft from the outside, illustrating the surface of the liner which is to be placed adjacent the fuselage skin.
Figure 6:
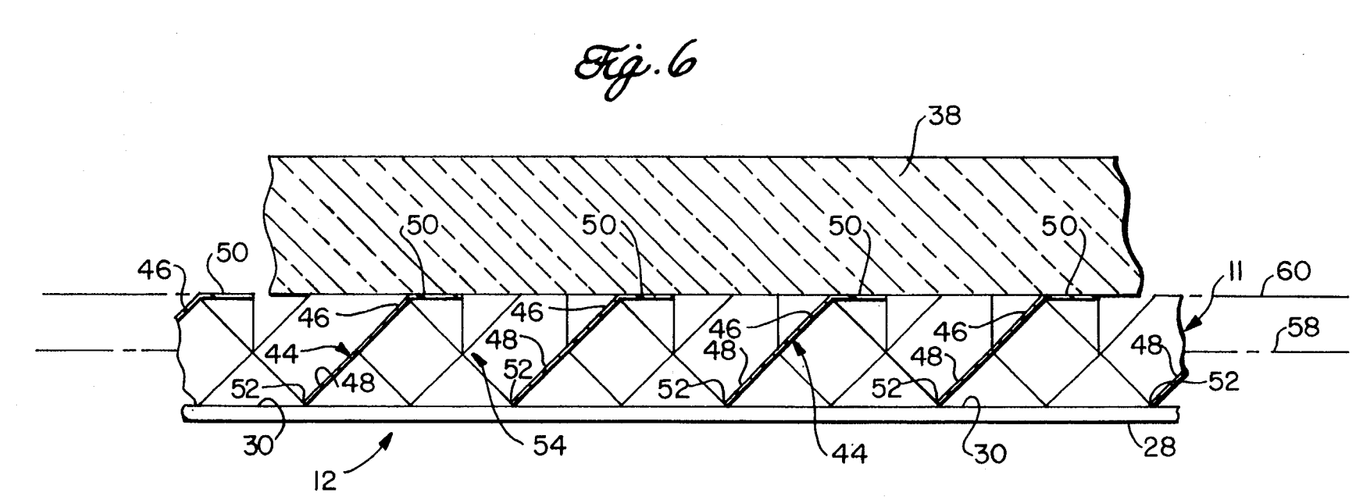
FIG. 6 is a semi-schematic cross-sectional side view of the liner taken along lines 6—6 of FIG. 4, illustrating the placement of the liner between the insulation blanket and the fuselage skin.

Turning now to FIGS. 4-6, there are shown semi-schematic fragmentary top and bottom plan views and a cross-sectional side view taken along line 6—6 of FIG. 4, respectively, of a preferred embodiment of a liner 11 of the present invention. The top plan view (FIG. 4) is a view of the liner 11 looking down from within the fuselage compartment of an aircraft, while the bottom plan view (FIG. 5) is a view of the liner 11 as it would appear as if looking through the fuselage skin from outside the aircraft.

Turning initially to FIG. 4, the liner 11 is described below as if it is placed on a flat horizontal surface with the portion of the liner which contacts the blanket being on the top, i.e., extending upwardly toward the viewer, and that portion of the liner which contacts the fuselage being on the bottom, i.e., extending downwardly away from the viewer. With reference to FIG. 5, the liner 11 is shown as if it is placed on a flat horizontal surface with the portion of the liner which contacts the inside surface of the fuselage skin on the top, i.e., extending toward the viewer, and that portion of the liner which contacts the blanket being on the bottom, i.e., extending away from the viewer. The liner has a length dimension L and a width dimension W as shown in FIGS. 4 and 5. The liner can be fabricated in any length desired and in different widths, depending upon the distance between the frames 40 in the particular aircraft into which the liner is to be installed.

Turning to FIG. 6 in addition to FIGS. 4 and 5, in the illustrated embodiment, the liner 11 has flat flange portions 42 and 43 (shown only in FIGS. 4 and 5) on its sides along its length, with a plurality of insulation blanket standoffs 46 extending upwardly from the plane of the sheet (shown as line 58 shown in FIG. 6). A plurality of skin standoffs 48 extend downwardly at an angle of approximately 45 degrees from the plane 58 of the sheet toward the inside surface of the fuselage skin 30 in a direction opposite from the direction of the blanket standoffs (in FIG. 5, the skin standoffs 48 are shown as extending toward the viewer). In the embodiment illustrated in FIGS. 4 and 6, the blanket standoffs 46 extend away from the plane 58 of the sheet a first distance in one direction, i.e., in the upwardly direction (away from the inside surface of the skin 30), and the skin standoffs 48 extend away from the plane of the sheet the same distance from the plane but in the opposite direction, i.e., in the downwardly direction (toward the inside surface of the skin 30). The blanket standoffs 46 and skin standoffs 48 are integral with one another, forming separating members 44 (best seen in FIG. 6). Referring to FIG. 6, the liner is interposed between the inside surface of the fuselage skin 30 and the thermal insulation 38 with the skin standoffs 48 directed against the inside surface of the skin in such a manner that, when taken at a vertical section of the fuselage (as best seen in FIG. 2), the skin standoffs are directed in a downward fashion. In a preferred embodiment, each skin standoff 48 intersects with the inside surface of fuselage skin 30 at an angle of less than or equal to 45 degrees. The angle of intersection will ultimately be a factor of the degree of loading between the liner and the skin. For example, a large degree of loading from the thermal insulation blanket onto the liner may cause the skin standoffs to flatten so that the intersecting angle is less than 45 degrees, wherein an increase in loading will have the effect of decreasing the intersecting angle. Conversely, a small degree of loading may not effect the skin standoff whatsoever, leaving the intersecting angle equal to the degree of skin standoff projection from the plane of the liner, approximately 45 degrees.

Referring to FIGS. 4 and 6, each blanket standoff 46 has an upper or top end portion 50 which preferably is in the form of a generally flat surface for accommodating the placement of the insulation blanket 38 thereon. Each skin standoff 48 (see FIGS. 5 and 6) has an end portion 52 that, in the illustrated embodiment, is a line surface which is placed against the inside surface of the skin 30. The distance between the end surfaces 50 on which the insulating blanket is placed and the ends 52 which contact the inside surface of the skin 30 is sufficient to provide a predetermined degree of separation between the skin and the blanket 38. In a preferred embodiment, this distance is in the range of from 6 to 26 millimeters (0.25 to 1 inch). In a particularly preferred liner this distance is approximately 19 millimeters (0.75 inches).

As best seen in FIGS. 4 and 5, a plurality of openings 54 are through the liner 11. Each opening 54 is positioned between and separates the end portion 52 of each skin standoff 48 and the end portion 50 of each blanket standoff 46. The openings 54 provide a path for condensate formed at or within the insulation blanket to flow from the insulation blanket, through the liner openings and to the inside surface of the skin where it can flow downwardly along the skin to the bilge for eventual removal from the aircraft. The openings also allow air that is circulated within the liners, between the inside surface of the skin and the blankets, to enter the blankets and effect vapor drying of small condensate droplets that can not drain on their own.

Figure 7:
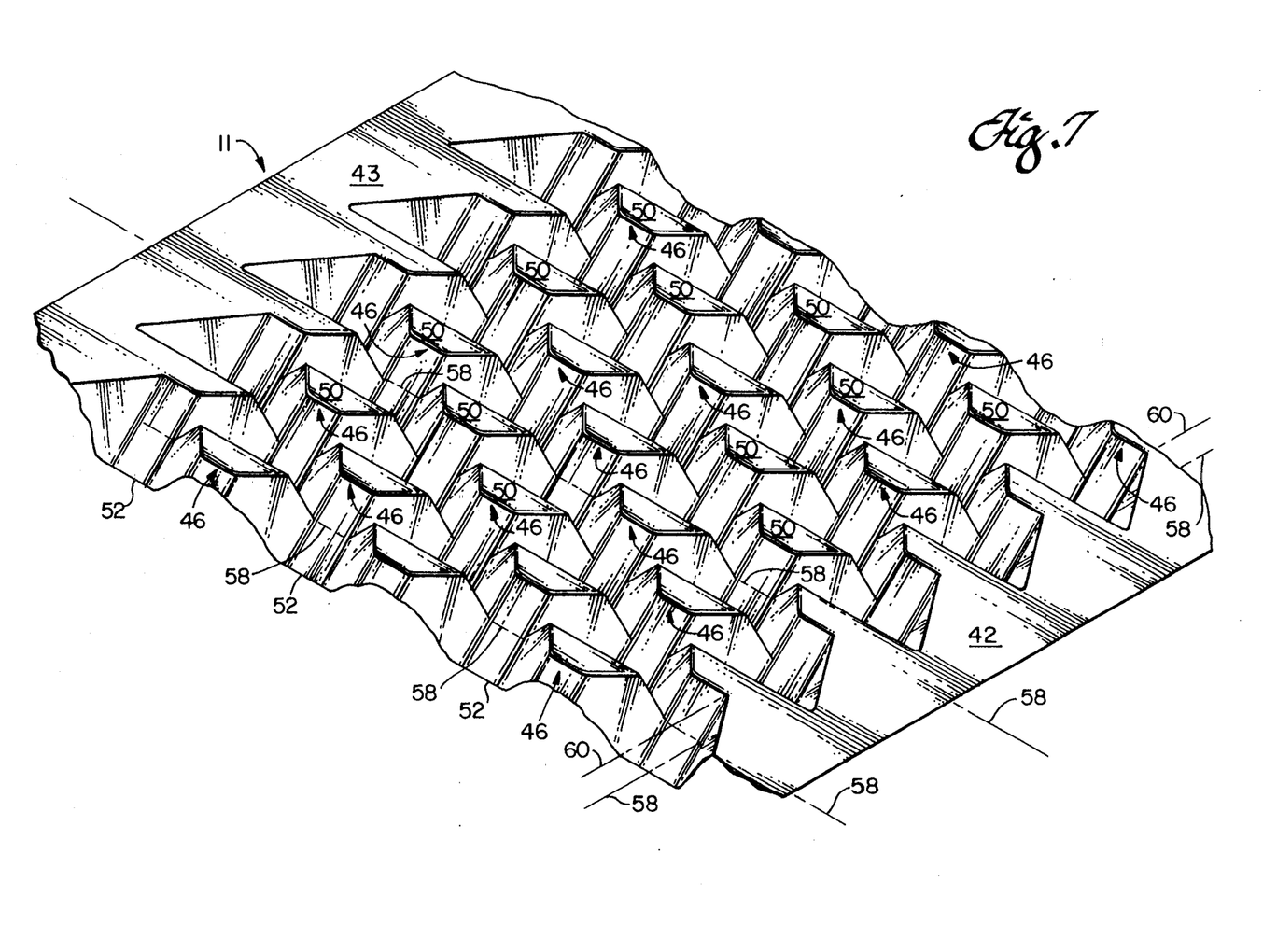
FIG. 7 is a semi-schematic isometric view of the embodiment of the liner shown in FIGS. 4–6.

Turning to FIG. 7, in addition to FIGS. 4-6, there is shown a fragmentary isometric view of the liner 11 as viewed from the surface of the liner which accommodates placement of the insulation blanket thereon. As can be seen by referring particularly to FIGS. 6 and 7, the blanket standoffs 46 extend in a uniform direction at an angle of approximately 45 degrees away from the plane 58 of the liner sheet. The plane of the liner sheet is shown in FIG. 7 as lines 58 extending both in the length and width direction of the liner. As is seen in FIG. 7, the plane 58 of the sheet is below and parallel to the plane defined by the flanges 42 and 43 shown as line 60. The flanges 42 and 43 are in the same plane and at the same elevation as the end portions 50 of the blanket standoffs 46. In a preferred embodiment, the blanket standoffs extend from the plane 58 of the liner sheet in the range of from 3 to 13 millimeters (0.12 to 0.5 inches). In a particularly preferred embodiment, the blanket standoffs extend approximately 10 millimeters (0.37 inches) from the plane of the liner sheet.

In the illustrated embodiment, the skin standoffs 48 extend from the plane of the liner sheet the same distance as the blanket standoffs at an angle of approximately 45° and in a direction opposite from the blanket standoffs. Accordingly, referring to FIGS. 2 and 6 when installed within an aircraft as previously described, the skin and blanket standoffs forming each separating member 44 serve to direct condensate drainage downwardly away from the blankets at an angle of approximately 45 degrees with respect to the tangential plane of the blanket surface.

Figure 8:
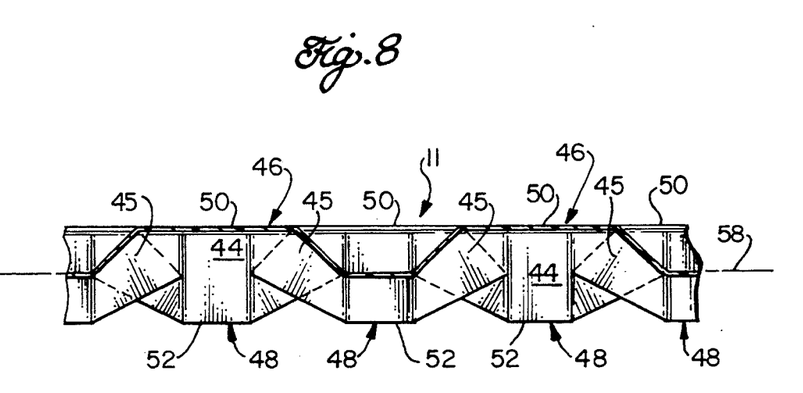
FIG. 8 is a semi-schematic cross-sectional side view of the liner taken along lines 8—8 of FIG. 4, illustrating the configuration of standoffs extending from a plane defined by the liner.

The shape and form of the blanket and skin standoffs provide the liner with a configuration that is resistant to being crushed and/or permanently deformed by the weight of the blanket during its installation or during aircraft operation. This is desired because during installation or maintenance, resistance to crushing and/or permanent deformation is needed because of extra loads put on the liners and/or liner/blanket combination by being stepped on, leaned against, or by the placement of heavy equipment thereon. The skin and blanket standoffs may extend from the liner sheet having a number of geometric configurations, such as square, rectangular, circular, trapezoidal, elliptical, or the like. As is best shown in FIG. 8, which is a cross-sectional side view of the liner shown in FIG. 4 along lines 8—8, a preferred embodiment of the liner comprises blanket standoffs 46 and skin standoffs 48 that extend from the plane of the liner sheet configured in the shape of a semi-hexagon. The semi-hexagonal configuration of each standoff is formed by the intersection between the separating member 44, that extends at an angle of approximately 45 degrees from the plane 58 of the sheet, and surrounding side wall members 45 that also extend from the plane of the sheet at an angle of approximately 45 degrees and intersect with the separating member 44 at a 45 degree angle. A semi-hexagonal shaped standoff configuration is desirable because it provides a desired degree of resilience or "spring back" to the liner structure to avoid crushing or permanent deformation. Although semi-hexagonal shaped standoffs are preferred, it is to be understood that the standoffs may be configured having various other shapes and are therefore meant to be within the scope of this invention.

The desired properties of the liner with respect to stiffness, height of support, material stress at given deformation, uniformity of stress of distribution within the material, and damage resistance when excessively deformed or crushed can be adjusted by varying the shape and geometry of the standoffs, the thickness of the liner sheet, the size and configuration of any flat portion provided by a standoff, and the modulus of elasticity of the material selected.

Referring again to FIG. 4, the liner 11 can best be described by referring to the matrix of blanket and skin standoffs as a compilation of rows, with each row extending across the width W of the liner from the flange 42 to the flange 43. A first row R1 shown between the lines 1-2 and 1-3 comprises a number of integrally connected alternating blanket standoffs 46 and skin standoffs 48. A second row R2 (shown between the lines 1-2 and 2-2) and third row R3 (shown between the lines 1-3 and 3-3) are positioned on each side of the first row R1 and each comprises a similar arrangement of alternating integrally connected blanket standoffs 46 and skin standoffs 48. However, the blanket and skin standoffs in the second and third rows are staggered or shifted in phase with respect to the blanket and skin standoffs in the first row. Accordingly, blanket standoffs 46 in the first row are positioned between skin standoffs 48 in both the second and third rows.

The skin standoffs 48 in the first row R1 are integral with the blanket standoffs 46 in the third row R3 that are positioned directly opposite the skin standoffs, forming separating members 44 shown in cross section in FIGS. 2, and 6. The skin standoffs 48 in the second row R2 are integral with the blanket standoffs 46 in the first row R1 that are directly opposite the skin standoffs, also forming the separating members 44. The flat end portion 50 of each blanket standoff 46 in the first row is separated from the end portion 52 of each skin standoff 48 in the third row directly opposite the blanket standoffs by the openings 54. In the same manner, the end portion 50 of each blanket standoff 46 in the second row is separated from the end portion 52 of each skin standoff 48 in the first row directly opposite the blanket standoffs by the openings 54.

As seen in FIG. 4, the liner 11 comprises a plurality of such rows arranged in this manner forming a plurality of columns extending along the length L of the liner, each column comprising alternating skin and blanket standoffs 46 and 48 respectively, that are integral with one another, forming separating members 44, and being separated at end portions by the plurality of openings 54. As described above, the openings between adjacent skin and blanket standoffs serve to facilitate the fluid flow of condensate from the blanket side of the liner to the fuselage skin and to permit the passage of air between the skin and blanket to effect vapor drying.

The liner 11 is formed from a sheet of material suitable for use in aircraft. For example, the liners may be yield formed from any ductile material, thermoplasticly formed from sheet material that has thermoplastic properties, yield bent from ductile sheet material, or mold formed from thermoplastic or thermosetting material. In addition, fiber reinforcement of many kinds could be possible with most of the above mentioned methods, either at forming time or by supplemental application. In one exemplary embodiment, the liner is formed of a polymeric thermoplastic sheet material and has a thickness in the range of from 0.1 to 0.5 millimeters (0.004 to 0.02 inches). Suitable thermoplastic materials for forming the liner sheet include without limitation, polymethyl methacrylate, polyvinyl chloride, acrylonitrilebutadienestyrene (ABS), polycarbonate, polyetherimide, polyetheretherkeytone (PEEK), polyetherkeytonekeytone (PEKK), polyarylsulfone (PAS), polyphenylene sulfide, polyethersulfone (PES), polysulfone, and polyimide.

The liner constructed according to principles of this invention may be configured in a number of different geometric shapes. A particularly preferred liner has a generally rectangular shape to facilitate the placement of the liner against the inside surface of the skin 30 between the circumferential frames 40, as shown in FIG. 3. Accordingly, it is desired that the liner have a width W corresponding to the distance between the circumferential frames within the aircraft. For example, the circumferential frames in a Boeing 747 and 767 commercial aircraft are spaced apart a distance of approximately 50 centimeters (20 inches). Therefore, the liner used in such an application preferably has a width of approximately 50 centimeters to accommodate its placement between the circumferential frames.

In the illustrated configuration, the flanges 42 and 43 are placed adjacent the circumferential frames 40 when the liners are installed into the aircraft. If desired the flanges may be configured having holes (not shown) to accommodate attachment with a complementary hook (not shown) or the like extending from the circumferential frames. The width of the flange may vary depending on the particular type and model of aircraft in which the liner is to be installed. For example, a liner constructed for use in a 747 may have a flange width on each end of approximately 20 millimeters (0.8 inches).

The length L of the liners may vary depending on the particular type and model of aircraft in which the liner is to be installed. For example, it is desired that a liner constructed for use in a 747 have a length of approximately 122 centimeters (48 inches). Depending on the circumferential length of the fuselage to be covered by the liner, a number of liners can be interlocked together to form longer liner sheets by overlapping the end portions of each liner sheet. Due to their complementary configuration, the overlapped sections interlock with one another. Alternatively, the end portions of the liners can be interlocked together by using conventional fastening means, such as fasteners or bonding and the like. Accordingly, it is to be understood within the scope of this invention that the dimensions of the liner may vary in order to accommodate its use with a variety of different commercial and/or private aircraft.

Various flammability properties of the material used to construct the liner may be required for aircraft applications, depending on FAA rules and customer requirements. One preferred material for forming a liner is polycarbonate, which is available in a number of flame retardant aircraft grades. It is preferred that the liner material be clear to permit the visual inspection of the skin of the aircraft by simply removing the insulation blanket without having to remove the liner. Polycarbonate and some other materials are available in clear. A particularly preferred material for forming a liner is polycarbonate supplied by General Electric Co., under the trademark "Lexan FR60". An additional preferred material having better flammability properties than polycarbonate is polyarysulfone.

Although a preferred embodiment of the liner has been described and illustrated, other liner configurations are understood to be within the scope of this invention. As previously described, a preferred liner comprises a plurality of standoffs and openings that separate the standoffs. The standoffs may extend away from the plane of the liner sheet in opposite directions, as described in the preferred embodiment, or may extend away from the plane of the liner sheet in only one direction.

It is important that the proper combination of material and sheet thickness be chosen so that the liners formed in accordance with the present invention have a sufficient amount of resiliency to inhibit crushing of the formed liner by the weight of the blanket. In selecting the material and sheet thickness, the loss of resiliency of the material in the formed liner due to its being stretched and thereby weakened during the standoff forming process must be considered. In one embodiment, polycarbonate with a sheet thickness of approximately 0.25 millimeters (0.01 inches) is used.

Because of the unique structure of the liner constructed according to principles of this invention, the sheet material selected can have a minimum thickness and still have the desired resilient qualities, thus is a light weight product making its use in an aircraft fuselage highly desirable.

The liner constructed according to the present invention may be formed by using conventional sheet plastic molding and forming techniques to provide the matrix of standoffs and openings in the sheet of thermoplastic material. Such techniques include without limitation, air forming, vacuum forming, pressure forming and the like. Preferably, the liner is formed by an air forming technique, using a heated stream of air to heat and deform the liner sheet so that it takes on the desired shape of an underlying mold which corresponds to the desired matrix of standoffs and openings.

Before the sheet is formed it is punched with indexing holes that identify the location for the openings, and slots are cut into the sheet that form the openings. The indexed and slotted sheet is roll fed into an air forming device. The air forming process is preferably a continuous process wherein the mold is moved under an air forming device or the air forming device is moved over the mold. The air forming device contains a heated and a cooled fast-moving air flow, each having an adjustable elongated orifice to control the air impingement on the sheet. The sheet is supported by the mold and heated to near its melting temperature by the fast moving heated air flow. When the sheet reaches its forming temperature the fast moving heated air flow pushes the sheet into the mold so that the sheet adopts the shape of the mold. The sheet is then cooled on the mold by using the cool air flow.

Although limited embodiments of the liner have been specifically described and illustrated herein, many modifications and variations will be apparent to those skilled in the art. For example, the liner may be constructed having a matrix of alternating standoffs and openings arranged or configured differently than that specifically described and illustrated. Accordingly, it is to be understood that, within the scope of the appended claims, the liner according to principles of this invention may be embodied other than as specifically described herein.

What is claimed is:

1. A resilient liner for use in an aircraft positioned between an inside surface of a fuselage skin and thermal insulation, the resilient liner comprising:
   (a) a sheet of material formed into a configuration comprising:
      (i) a plurality of first standoffs integral with the sheet of material, each first standoff extending a predetermined distance from a plane defined by the sheet, wherein each first standoff comprises a line surface to accommodate engagement with an adjacent surface of the fuselage skin;
      (ii) a plurality of second standoffs integral with the material sheet and the first standoffs, each such second standoff extending a predetermined distance from the plane of the sheet in a direction opposite to the first standoffs, wherein each second standoff comprises a flat surface portion to accommodate placement of thermal insulation thereon; and
      (iii) a plurality of openings through the sheet of material, wherein each opening extends from the line surface of a first standoff to an adjacent flat surface of a second standoff.

2. The resilient liner as recited in claim 1 comprising a plurality of rows comprising an alternating arrangement of first and second standoffs that are staggered from the arrangement of first and second standoffs in adjacent rows so that the first standoffs in one row are adjacent and directly opposite to second standoffs in adjacent rows, the standoffs in adjacent rows forming columns of alternating first and second standoffs, wherein the rows extend across the width of the liner and the columns extend along the length of the liner.

3. The resilient liner as recited in claim 2 wherein the arrangement of rows and columns form a matrix of first and second standoffs, the first and second standoffs within each column being integral with one another to form a separating member that defines the distance of separation between an inside surface of an aircraft fuselage skin and an insulation blanket.

4. The resilient liner as recited in claim 1 wherein the first and second standoffs each extend away from each other in opposite directions at an angle of approximately 45 degrees from the plane of the sheet.

5. The resilient liner as recited in claim 1 wherein the first and second standoffs each extend from the plane of the sheet having a semi-hexagonal configuration.

6. The resilient liner as recited in claim 1 wherein each first standoff intersects against an inside surface of the fuselage skin at an angle of less than or equal to 45 degrees.

7. A resilient liner for use in an aircraft fuselage, the liner being positioned between an inside surface of a fuselage skin and a thermal insulation blanket, the liner being formed from a sheet of polymeric material, the liner comprising:
   a plurality of skin standoffs that each extend in a uniform direction away from a plane defined by the polymer sheet, each skin standoff having an end portion placed against the inside surface of the fuselage skin so that it intersects the fuselage skin at an angle of less than or equal to 45 degrees;
   a plurality of insulation blanket standoffs that each extend in a uniform direction away from the plane of the polymer sheet in a direction opposite to the skin standoffs, each blanket standoff having an end portion placed against the insulation blanket; and
   a plurality of openings through the liner between the skin and blanket standoffs.

8. The resilient liner as recited in claim 7 wherein the sheet of material is selected from the group of thermoplastic materials consisting of polymethyl methacrylate, polyvinyl chloride, acrylonitrilebutadienestyrene, polycarbonate, polyetherimide, polyetheretherkeytone, polyetherkeytonekeytone, polyarylsulfone, polyphenylene sulfide, polysulfone, and polyimide.

9. The resilient liner as recited in claim 8 wherein the sheet of material has a thickness in the range from 0.1 to 0.5 millimeters.

10. The resilient liner as recited in claim 9 wherein the openings separate the end portion of the insulation blanket standoffs from the end portion of adjacent skin standoffs.

11. The resilient liner as recited in claim 10 wherein the liner comprises a matrix of uniformly repeating skin standoffs, insulation blanket standoffs, and openings, the matrix being formed from a plurality of rows comprising an alternating arrangement of integrally connected skin and insulation blanket standoffs, each row being staggered so that a skin standoff of one row is directly opposite to a insulation blanket standoff in an adjacent row.

12. The resilient liner as recited in claim 11 wherein the standoffs in adjacent rows form columns of alternating skin standoffs and insulation blanket standoffs, each skin standoff within a column being integral with an adjacent blanket standoff forming a separating member, each separating member defining the amount of separation between the skin and the insulation blanket.

13. The resilient liner as recited in claim 12 wherein each insulation blanket standoff and each skin standoff extends in opposite directions from the plane defined by the sheet of material in the range of from 3 to 13 millimeters.

14. The resilient liner as recited in claim 12 wherein the distance between the end portion of a skin standoff and the end portion of an adjacent insulation blanket standoff that defines the amount of separation between the inside surface of the fuselage skin and the insulation blanket is in the range of from 12 to 26 millimeters.

15. The resilient liner as recited in claim 12 wherein each skin standoff extends from the plane of the sheet at an angle of approximately 45 degrees, and each insulation blanket standoff extends from the plane of the sheet in an opposite direction at an angle of approximately 45 degrees.

16. The resilient liner as recited in claim 12 wherein the skin and blanket standoffs each extend from the plane of the sheet having a semi-hexagonal configuration.

17. A resilient liner for use within a fuselage compartment of an aircraft between an inside surface of a fuselage skin and a thermal insulation blanket, the liner is formed from a sheet of material comprising a plurality of standoffs extending away from a plane defined by the sheet a predetermined distance that corresponds to a predetermined amount of separation between the skin and the blanket, the standoffs being integral to the sheet and formed from portions of the sheet deformed away from the plane, the standoffs being separated from the sheet by a plurality of openings, wherein each opening extends between a first standoff that projects from the plane in one direction to an adjacent second standoff that projects from the plane in a direction opposite from the first standoff.

18. The resilient liner as recited in claim 17 wherein the plurality of standoffs comprise skin standoffs projecting from the plane of the sheet in one direction, each skin standoff having a line surface end portion for placement against the inside surface of the fuselage skin.

19. The resilient liner as recited in claim 18 wherein the plurality of standoffs comprise insulation blanket standoffs projecting from the plane of the sheet in a direction opposite to the skin standoffs, each insulation blanket standoff having a planer end portion to accommodate placement of the insulation blanket thereon, the openings being positioned between and separating the end portions of adjacent skin and insulation blanket standoffs.

20. The resilient liner as recited in claim 19 wherein the distance between the end portions of standoffs projecting away from opposite surfaces of the liner sheet is in the range of from 12 to 26 millimeters.

21. The resilient liner as recited in claim 20 wherein each standoff projects away from the plane of the sheet at an angle of approximately 45 degrees.

22. A resilient liner for use in an aircraft, wherein the liner is positioned between an inside surface of a fuselage skin and thermal insulation, the resilient liner comprising:
 a sheet of thermoplastic material;
 a plurality of skin standoffs integral with the sheet projecting in one direction from a plane defined by the sheet, wherein each skin standoff comprises an end portion for accommodating placement against the fuselage skin;
 a plurality of blanket standoffs integral with the sheet projecting in one direction from the plane of the sheet opposite from the skin standoffs, wherein each blanket standoff comprises an end portion to accommodate placement of thermal insulation thereon, wherein the skin and blanket standoffs are formed from deformed portions of the sheet; and
 a plurality of openings within the sheet disposed between adjacent skin and blanket standoffs, wherein each opening extends from an end portion of each skin standoff to an end portion of each blanket standoff.

23. The resilient liner as recited in claim 22 comprising a plurality of separating members integral with the sheet, wherein each separating member extends from an end portion of each skin standoff to an end member of each blanket standoff to define a predetermined distance of separation between the thermal insulation and fuselage skin.

24. The resilient liner as recited in claim 23 wherein each blanket and skin standoff projects from the plane of the sheet in opposite directions at an angle of approximately 45 degrees from the plane of the sheet.

25. The resilient liner as recited in claim 24 wherein each skin standoff intersects against an inside surface of the fuselage skin at an angle of less than or equal to 45 degrees.

26. The resilient liner as recited in claim 25 wherein each blanket and skin standoff extends from the plane of the sheet in the range of from 3 to 13 millimeters.

27. The resilient liner as recited in claim 26 wherein the end portion of each skin standoff comprises a line surface engaged against the inside fuselage surface.

* * * * *

UNITED STATES PATENT AND TRADEMARK OFFICE
CERTIFICATE OF CORRECTION

PATENT NO. : 5,398,889

DATED : March 21, 1995

INVENTOR(S) : Roland J. White; Douglas H. Quimby; Brian M. Clark; James W. Clyne, Jr.

It is certified that error appears in the above-indentified patent and that said Letters Patent is hereby corrected as shown below:

On the Title page, Abstract, line 6, change "surfaca" to -- surface --.

Column 7, line 23, change "effect" to -- affect --.

Column 10, line 49, change "polyarysulfone" to -- polyarylsulfone --.

Column 13, line 2, before "insulation" change "a" to -- an --.

Column 13, line 56, change "planer" to -- planar --.

Signed and Sealed this

Twenty-sixth Day of September, 1995

Attest:

BRUCE LEHMAN

*Attesting Officer*    *Commissioner of Patents and Trademarks*